United States Patent
Roberson

(10) Patent No.: US 10,655,458 B2
(45) Date of Patent: May 19, 2020

(54) SYSTEM AND METHOD FOR COMMUNICATING ALONG A CASING STRING INCLUDING A HIGH MAGNETIC PERMEABILITY SUBSTRATE

(71) Applicant: Halliburton Energy Services, Inc., Houston, TX (US)

(72) Inventor: Mark W. Roberson, Cary, NC (US)

(73) Assignee: Halliburton Energy Services, Inc., Houston, TX (US)

(*) Notice: Subject to any disclaimer, the term of this patent is extended or adjusted under 35 U.S.C. 154(b) by 10 days.

(21) Appl. No.: 15/552,543

(22) PCT Filed: Feb. 27, 2015

(86) PCT No.: PCT/US2015/017961
§ 371 (c)(1),
(2) Date: Aug. 22, 2017

(87) PCT Pub. No.: WO2016/137484
PCT Pub. Date: Sep. 1, 2016

(65) Prior Publication Data
US 2018/0023388 A1   Jan. 25, 2018

(51) Int. Cl.
*E21B 47/12* (2012.01)
*G01V 3/28* (2006.01)
*E21B 17/02* (2006.01)
*G01V 3/34* (2006.01)

(52) U.S. Cl.
CPC .......... *E21B 47/122* (2013.01); *E21B 17/028* (2013.01); *G01V 3/28* (2013.01); *G01V 3/34* (2013.01)

(58) Field of Classification Search
CPC ....... E21B 47/122; E21B 17/028; G01V 3/28; G01V 3/34
See application file for complete search history.

(56) References Cited

U.S. PATENT DOCUMENTS

| | | |
|---|---|---|
| 5,818,352 A | 10/1998 | McClure |
| 2003/0184303 A1 | 10/2003 | Homan et al. |
| 2004/0079524 A1 | 4/2004 | Bass et al. |
| 2010/0039285 A1 | 2/2010 | Vornbrock |
| 2013/0048269 A1 | 2/2013 | Tarayre et al. |

OTHER PUBLICATIONS

International Search Report and Written Opinion issued in corresponding application No. PCT/US2015/017961 dated Nov. 9, 2015, 14 pgs.

*Primary Examiner* — Giovanna C Wright
*Assistant Examiner* — Yanick A Akaragwe
(74) *Attorney, Agent, or Firm* — Chamberlain Hrdlicka

(57) ABSTRACT

A communication assembly is described that when placed around a string casing in a wellbore transmits data along a pipe string from the wellbore to, for example, the surface of the well. The assembly includes a high magnetic permeability substrate to eliminate signal loss to the casing string thereby enhancing the signal and improving data transmission.

15 Claims, 3 Drawing Sheets

SYSTEM AND METHOD FOR COMMUNICATING ALONG A CASING STRING INCLUDING A HIGH MAGNETIC PERMEABILITY SUBSTRATE

BACKGROUND

Natural resources such as gas, oil, and water residing in a subterranean formation or zone are usually recovered by drilling a wellbore into the subterranean formation. Potentially, during the drilling process, a string of pipe (e.g., casing) is run in the wellbore and cemented in place. Cementing is typically performed whereby a cement slurry is placed in the annulus outside the casing and permitted to set into a hard mass (i.e., sheath) to thereby attach the string of pipe to the walls of the wellbore and seal the annulus.

In the performance of such a cementing operation, or in the performance of one or more other wellbore operations (e.g., a drilling operation, a stimulation operation, a completion operation, a fluid-loss control operation, production, or combinations thereof), it may be desirable to obtain data from within the wellbore, for example, data related to the conditions within the wellbore or data related to the operation or performance of downhole tools positioned within the wellbore.

Such data may include geology, rate of rock penetration, inclination, azimuth, fluid composition, temperature, and pressure, among others. Special downhole assemblies have been developed to monitor subsurface conditions. These assemblies are generally referred to as Logging While Drilling (LWD) or Measurement While Drilling (MWD) assemblies. LWD and MWD assemblies can be carried by downhole tools or any other apparatus that is placed downhole, and are able to store or transmit information about subsurface conditions for review by drilling or production operators at the surface.

A variety of technologies have been proposed or developed for downhole communications using LWD or MWD. In a basic form, MWD and LWD assemblies can store information in a processor having memory. The processor can be retrieved, and the information downloaded, later, when the downhole tool is removed from the wellbore.

Several real time data telemetry systems have also been proposed. Some involve the use of physical cable such as a fiber optic cable that is secured to the casing string. The cable may be secured to either the inner or outer diameter of the casing string. The cable provides a hard wire connection that allows for real time transmission of data and the immediate evaluation of subsurface conditions. Further, these cables allow for high data transmission rates and the delivery of electrical power directly to downhole sensors. As an alternative to such a wired system, nodes have been placed along a casing string to utilize near-field communications (NFC), to communicate one or more signals between nodes and up the casing string to the surface. The node-to-node communication allows transmission of data up the wellbore. The use of radio frequency signals has also been suggested.

These systems all require data to be transmitted over a long distance through multiple nodes. The data signal that reaches the surface is only as good as the signal that can be passed between nodes. Thus, a need exists for a data transmission system that can transmit data between communication nodes.

DETAILED DESCRIPTION

Figure 1:
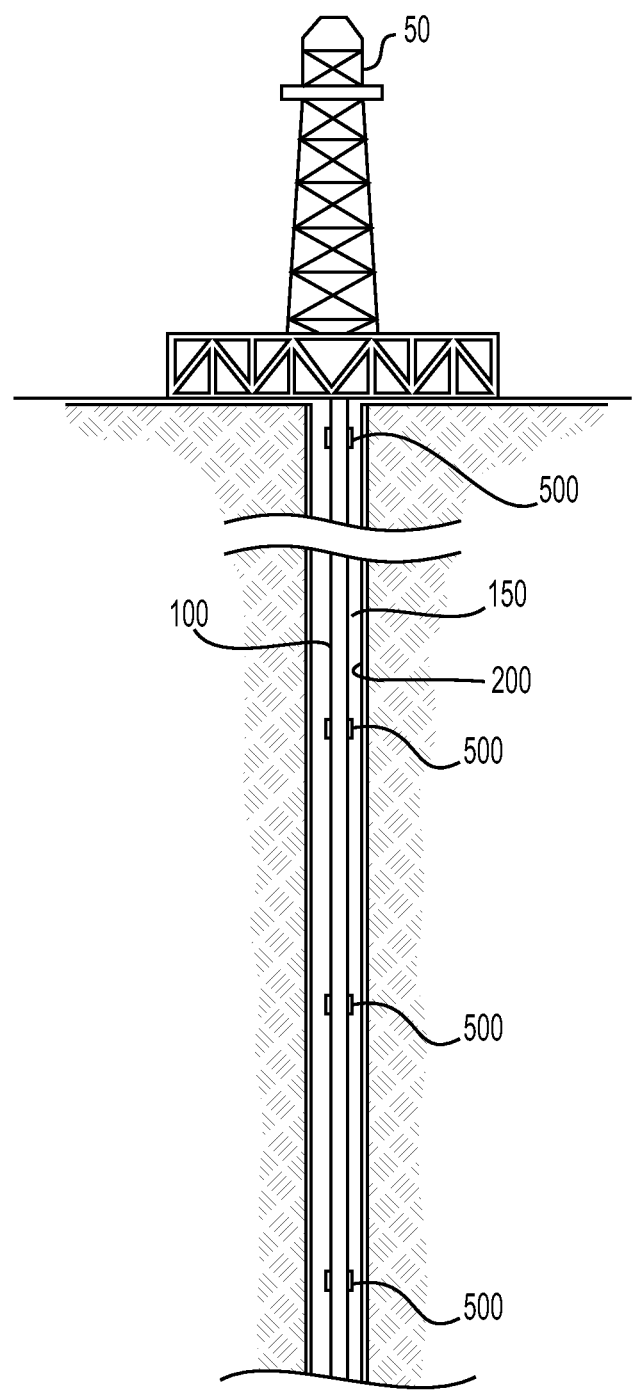
FIG. 1 illustrates one embodiment of an oil rig and wellbore.

The following discussion is directed to various embodiments of the invention. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed below may be employed separately or in any suitable combination to produce desired results. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not structure or function.

In the following discussion and in the claims, the terms "including" and "comprising" are used in an open-ended fashion, and thus should be interpreted to mean "including, but not limited to . . . The use of "top," "bottom," "above," "below," and variations of these terms is made for convenience, but does not require any particular orientation of the components.

Unless otherwise specified, use of the terms "up," "upper," "upward," "up-hole," "upstream," or other like terms shall be construed as generally from the formation toward the surface or toward the surface of a body of water; likewise, use of "down," "lower," "downward," "downhole," "downstream," or other like terms shall be construed as generally into the formation away from the surface or away from the surface of a body of water, regardless of the wellbore orientation. Use of any one or more of the foregoing terms shall not be construed as denoting positions along a perfectly vertical axis.

As used herein, the term "well" may be used interchangeably with the term "wellbore."

Described herein are a system and method for communicating along a pipe string in a subterranean formation. Communication along the pipe string is accomplished using a communication system made up of a number of coil communication assemblies. The coil communication assemblies are in spaced locations along a pipe string and are used to transmit a signal along the pipe string, e.g., from a sensor, to a receiver for the signal. While discussion may be in terms of signals being transmitted to the surface from a subsurface location, the receiver may be located anywhere within the wellbore, for example, intermediate the sensor and the surface or below the sensor.

The coil communication assemblies comprise a transmission coil and a high magnetic permeability substrate that enhances the passage of a signal between the coil communication assemblies by preventing signal loss to the pipe string.

FIG. 1 exemplifies a rig 50 and a wellbore 200. According to the embodiment shown, a casing string 100 extends the length of the wellbore 200. An annulus 150 is created between the casing string 100 and the wall of the wellbore 200. Coil communication assemblies 500 are placed at spaced locations along the casing string 100 in the wellbore 200. The coil communication assemblies 500 are configured to be attached to the exterior of the casing string 100. Any suitable attachment method may be used.

In one embodiment, the coil communication assemblies 500 may be used to transmit data along the casing string 100 to the surface of the wellbore 200. According to another embodiment, coil communication assemblies 500 send and receive signals via electromagnetic communications from adjacent coil communication assemblies 500. The signal transmission moves either up or down the casing string 100. According to yet another embodiment, the signal can be transmitted from an LWD or MWD assembly, along the casing string 100 up to the surface of the wellbore 200, or downward to an alternate receiver. While the invention will be explained with reference to LWD and MWD assemblies, the signals that may be transmitted via this communication system can include data from other downhole tools or other sensors that are located in the wellbore 200.

The coil communication assemblies 500 may be at spaced intervals along the casing string. The distance between assemblies may be from about 2 to about 100 meters, for example, from about 10 to about 50 meters, for example, from about 10 to about 30 meters, for example, about 15 to 30 meters. According to one embodiment, the coil communication assemblies may be spaced in a manner that creates some redundancy thereby allowing for a number of faulty assemblies within the communication system, without loss of communication. According to another embodiment, the coil communication assemblies may be placed at inconsistent or staggered lengths, for example, 10 meters between assemblies, followed by 20 meters between assemblies, and then maybe 30 meters between assemblies. Alternatively, the assemblies may be staggered inconsistently, for example, 10 meters between assemblies, followed by 30 meters between assemblies, followed by 10 meters between assemblies, followed by 20 meters between assemblies, or any suitable combination of distances.

While the embodiments described relate to casing strings, the coil communication assemblies 500 can be used to transmit signals along any pipe string, for example, a drill pipe, a casing string, a production tubing, coiled tubing, or injection tubing. The communication system can be used to transmit along a vertical axis, a horizontal axis or any other axis or wellbore direction.

Figure 2:
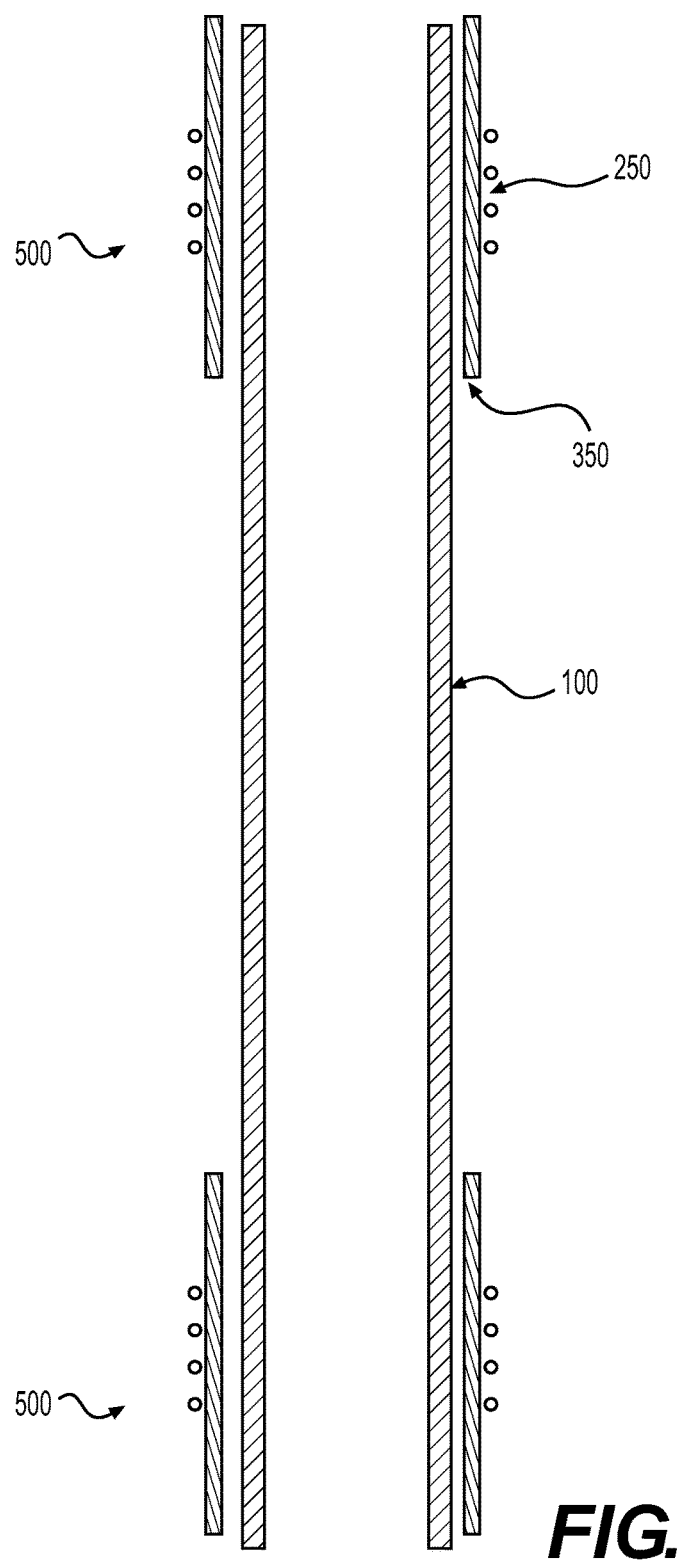
FIG. 2 is a cut away view of a casing string and one embodiment of the coil communication assemblies.

According to one embodiment shown in FIG. 2, the coil communication assemblies 500 comprise a high magnetic permeability substrate 350 and a winding wire 250 that transmits data via electromagnetic communication along the casing string 100. The high magnetic permeability substrate as described herein has a relative permeability, of from about 100 to about 30,000, for example, 4000 to 30,000, for example 5,000 to 10,000, for example, greater than about 5000. The high magnetic permeability material may be chosen from iron, manganese, nickel, zinc, other ferromagnetic materials, oxides and combinations thereof. The transmission wire 250 may be chosen from any art recognized wire, including but not limited to copper, aluminum, steel, silver, and alloys thereof.

Figure 3:
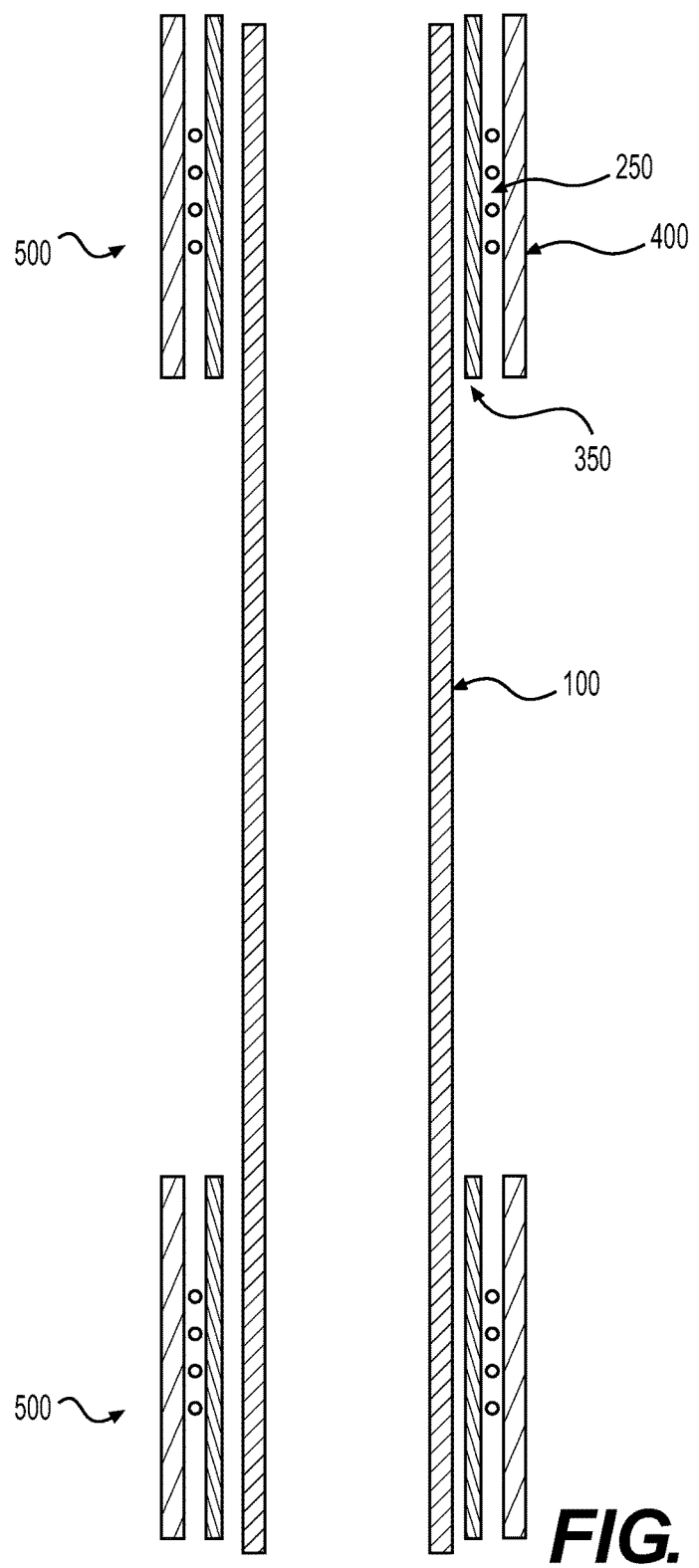
FIG. 3 is a cut away view of the casing string and another embodiment of the coil communication assemblies.

According to another embodiment as shown in FIG. 3, the coil communication assemblies 500 comprise high magnetic permeability substrate 350 to minimize signal loss into the casing string, and a winding wire 250 that transmits data electromagnetically along the casing string 100. According to the embodiment shown, a second magnetic substrate 400 surrounds the winding wire 250 and attenuates interfering signals. The second magnetic substrate can also have a relative permeability, $\mu_r$, of from about 1 to about 30,000, for example, 1 to 100, for example 1 to 500, for example 2 to 100, for example 100 to 30,000, for example, 4000 to 30,000, for example 5,000 to 10,000, for example, greater than about 5000. The second magnetic substrate 400 material may be chosen from iron, manganese, nickel, zinc, other ferromagnetic materials, oxides, layered dielectrics, metamaterials and combinations thereof. The second magnetic substrate 400 can be selected to have a relative magnetic permeability which results in a frequency dependent attenuation of the signals. According to one embodiment, the second magnetic substrate may be formed from metamaterials or a layered dielectric to form a resonant circuit.

The coil communication assemblies 500 can receive and convey information to the surface without storing the information. Likewise, the coil communication assemblies 500 can include one or more storage devices that may store and transmit data or that may store and hold data for later reading. The communication system may communicate with the surface of the wellbore 200 wirelessly. While not intended to be used in a wired system, the use of wiring, in whole or in part, is not outside the scope and spirit of these embodiments. Appropriate data storage and wired communication systems are well understood by the skilled artisan.

There is further described a method for communicating between a subsurface location and the surface of a well or between two locations within the wellbore 200. When a wellbore 200 has one or more sensors, or LWD or MWD assemblies, or other device that can measure conditions in the wellbore 200, the communication system as described can be used to transmit that information to the surface of the well or some other location in the well in real time. The sensor or LWD assembly, for instance, transmits the data signal to a first coil communication assembly 500 that is coupled to the exterior of the pipe string 100 using any suitable coupling method. The signal from the first coil communication assembly 500 will be transmitted to an adjoining communication assembly 500 regardless of direction, i.e., the signal can be transmitted up the pipe string or down the pipe string. According to one embodiment, a condition in the wellbore is sensed, the data is transmitted from a sensor to a proximate coil communication assembly 500. The signal may them be repeatedly transmitted to the adjacent coil communication assembly 500 until the signal reaches a receiver at the surface of the wellbore. Alternatively, for example, a condition has been sensed by a senor, e.g., cement, the signal may be transmitted down the pipe string, for example, to communicate with a receiver that would, for example, instruct a downhole tool to close a port. In the method as described the signal is generally transmitted to a receiver that either resides within the wellbore 200 or that is above the surface of the wellbore. Any suitable receiver can be used and appropriate receivers are well understood by the skilled artisan.

Transmission of the signal between the coil communication assemblies 500 is enhanced by locating a high permeability substrate 350 between the transmission coil 250 and the pipe string 100. The high magnetic permeability substrate 350 minimizes signal loss into the pipe string 100.

When the coil communication assembly 500 includes both a high magnetic permeability substrate 350 and a second magnetic substrate 400, the second magnetic substrate 400 can attenuate interfering signals thereby improving the signal as it moves axially along the pipe string 100. Not wishing to be bound by theory, the modeling of the magnetic permeability materials not only improve signal transmission by avoiding signal loss and removing interference, but it also alters the magnetic field pattern which itself improved operational performance.

According to an embodiment, were the casing string 100 to be made of an appropriate material, for example, a non-metallic casing, the transmission coil 250 could be wrapped around the exterior of the casing string or embedded into the casing string. According to another embodiment, the high permeability magnetic substrate 350 can be in the form of a coating which surrounds the wire of the transmission coil 250. Such a coated transmission wire 250 could be wrapped around the casing string or embedded in the casing string. According to yet another embodiment, the transmission coils 250 may be wrapped in a toroidal fashion rather than in a solenoidal fashion.

Although specific embodiments have been illustrated and described herein, it should be appreciated that any arrangement configured to achieve the same purpose may be substituted for the specific embodiments shown. This disclosure is intended to cover any and all adaptations or variations of various embodiments. Combinations of the above embodiments, and other embodiments not described herein, will be apparent to those of skill in the art upon reviewing the above description.

As used herein, "about" is meant to account for variations due to experimental error. All numerical measurements are understood to be modified by the word "about", whether or not "about" is explicitly recited, unless specifically stated otherwise. Thus, for example, the statement "a distance of 10 meters," is understood to mean "a distance of about 10 meters."

The invention claimed is:

1. A system for communicating from within a subterranean wellbore to the surface of the wellbore, comprising:
a pipe string configured to be located within a subterranean wellbore, the pipe string comprising an exterior; and
a coil communication assembly at a location along the pipe string, the coil communication assembly comprising:
a transmission coil wrapped around the exterior of the pipe string and configured to transmit a signal along the pipe string;
a high magnetic permeability substrate located between the exterior of the pipe string and the transmission coil and configured to minimize signal loss from the transmission coil into the pipe string; and
a second magnetic substrate positioned outside the transmission coil and the high magnetic permeability substrate, wherein the second magnetic substrate comprises a relative magnetic permeability so as to be configured to provide a frequency dependent attenuation of interfering signals.

2. The system of claim 1, wherein the high magnetic permeability substrate comprises a relative magnetic permeability $\mu_r$ of 100 to 30,000.

3. The system of claim 1, wherein the pipe sting comprises a casing string, and wherein the high magnetic permeability substrate has a relative magnetic permeability $\mu_r$ of greater than 5,000.

4. The system of claim 1, further comprising more than one coil communication assemblies at spaced locations along the pipe string.

5. The system of claim 4, wherein the coil communication assemblies are spaced between 10 meters and 30 meters apart along the pipe string.

6. The system of claim 5, wherein the second magnetic substrate comprises a relative magnetic permeability pr of 1 to 30,000.

7. The system of claim 4, wherein the pipe string is a casing string and wherein at least one second communication assembly comprises multiple coil communication assemblies at spaced locations along the casing string.

8. The system of claim 1, wherein the transmission coil comprises a copper coil.

9. The system of claim 1, wherein the high magnetic permeability substrate comprises one or more ferromagnetic materials.

10. The system of claim 1, wherein the coil communication assembly is configured to receive data from a logging-while-drilling or measurement-while-drilling tool.

11. The system of claim 1, wherein the high magnetic permeability substrate is coated on wire of the transmission coil.

12. A method for communicating between two locations in a subterranean wellbore including a pipe string comprising:
sensing a condition of the wellbore;
transmitting a signal indicative of the sensed condition from a first location;
retransmitting the signal indicative of the sensed condition along the pipe string via a transmission coil wrapped around the pipe string and without an additional power input;
minimizing signal loss into the pipe string during the retransmission of the signal via a high magnetic permeability substrate located between the exterior of the pipe string and the transmission coil;
attenuating the signal for interfering signals prior to retransmission by surrounding the transmission coil with a second magnetic substrate comprising a relative magnetic permeability to provide a frequency dependent attenuation of signals; and
receiving the transmitted signal at a receiver at a second location.

13. The method of claim 12 wherein the pipe string is a casing string and the transmission coil is wrapped around the casing string in the wellbore.

14. The method of claim 12, wherein the signal is retransmitted at least twice.

15. The method of claim 14, wherein the signal is retransmitted a distance from 10 meters to 30 meters before being received.

* * * * *

UNITED STATES PATENT AND TRADEMARK OFFICE
CERTIFICATE OF CORRECTION

PATENT NO.         : 10,655,458 B2                                       Page 1 of 1
APPLICATION NO.    : 15/552543
DATED              : May 19, 2020
INVENTOR(S)        : Mark W. Roberson It is certified that error appears in the above-identified patent and that said Letters Patent is hereby corrected as shown below:

In the Claims

Column 6, Line 15, "pr" should be -- $\mu_r$ --

Signed and Sealed this
Thirtieth Day of June, 2020

Andrei Iancu
*Director of the United States Patent and Trademark Office*